United States Patent
Ikeguchi (10) Patent No.: US 8,325,319 B2
(45) Date of Patent: Dec. 4, 2012

(54) LIQUID CRYSTAL DISPLAY PANEL AND METHOD FOR MANUFACTURING THE SAME

(75) Inventor: Tazo Ikeguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 12/646,473

(22) Filed: Dec. 23, 2009

(65) Prior Publication Data

US 2010/0097560 A1    Apr. 22, 2010

(30) Foreign Application Priority Data

Jun. 12, 2007    (JP) .................. 2007-155195

(51) Int. Cl.
*G02F 1/1339*    (2006.01)

(52) U.S. Cl. .......... 349/190; 349/153; 349/155; 430/20; 313/512

(58) Field of Classification Search ................. 349/153, 349/190, 155; 345/82

See application file for complete search history.

(56) References Cited

U.S. PATENT DOCUMENTS

| | | | |
|---|---|---|---|
| 6,717,052 B2 * | 4/2004 | Wang et al. .................. | 174/381 |
| 2007/0279571 A1 * | 12/2007 | Koo et al. ..................... | 349/153 |

FOREIGN PATENT DOCUMENTS

| | | | |
|---|---|---|---|
| JP | 11-44869 A | | 2/1999 |
| JP | 11-044878 | * | 2/1999 |
| JP | 11-44878 A | | 2/1999 |
| JP | 2002-174818 A | | 6/2002 |
| JP | 2004-212449 A | | 7/2004 |
| JP | 2005-221764 A | | 8/2005 |
| JP | 2006-30440 A | | 2/2006 |
| JP | 2006-84881 A | | 3/2006 |

* cited by examiner

*Primary Examiner* — Edward Glick
*Assistant Examiner* — Sang Nguyen
(74) *Attorney, Agent, or Firm* — Birch, Stewart, Kolasch & Birch, LLP (57) ABSTRACT

A method for manufacturing a liquid crystal display panel includes applying a first frame-like sealing material, and a second sealing material adjacent to the first sealing material along at least one side of the first sealing material, on a first mother substrate; forming a spacer on a second mother substrate made of glass so as to extend between the first and second sealing materials; bonding the first mother substrate on which the first and second sealing materials are applied, and the second mother substrate on which the spacer is formed, to each other such that the first and second sealing materials are in contact with each other without gaps with the spacer being interposed therebetween, and that a liquid crystal layer is sealed within the frame defined by the first sealing material; and cutting the bonded mother substrates at an intermediate position in the width direction of the spacer.

7 Claims, 6 Drawing Sheets

LIQUID CRYSTAL DISPLAY PANEL AND METHOD FOR MANUFACTURING THE SAME

CROSS-REFERENCE TO RELATED APPLICATION

This application relates to Japanese Patent Application No. 2007-155195 filed on Jun. 12, 2007, the disclosure of which including the specification, the drawings, and the claims is hereby incorporated by reference in its entirety.

BACKGROUND

The present disclosure relates to a liquid crystal display panel and a manufacturing method thereof, and particularly relates to a liquid crystal display panel manufactured with sealing material being applied (written or painted).

A liquid crystal display panel includes a pair of substrates arranged so as to oppose each other; a liquid crystal layer provided between such substrates; and sealing material for bonding the substrates to each other, and for sealing the liquid crystal layer.

For example, Japanese Patent Publication No. 11-44869 describes a method for manufacturing a strong liquid crystal display panel having a good cutting surface by simultaneously cutting sealing material and a pair of glass substrates with the sealing material being interposed between the pair of substrates.

Recently, in a manufacturing process of liquid crystal display panels, a one-drop-filling method with higher productivity than that of a conventional dipping injection method has been frequently used as a method for sealing a liquid crystal layer between a pair of substrates. In such a one-drop-filling method, e.g., after applying sealing material in a frame-like shape on a surface of one of a pair of substrates, and dispensing liquid crystal material onto the substrate surface within the frame defined by the sealing material, such a substrate is bonded to another substrate. As a method for dispensing sealing material onto a substrate surface, a method in which, while discharging sealing material from a nozzle tip, a substrate or nozzle is moved has been frequently used.

Liquid crystal display panels have been often manufactured by a so-called "gang printing" in which a single glass substrate is divided and cut into a plurality of cell units. There is a method for cutting a pair of glass substrates on sealing material as described in Japanese Patent Publication No. 11-44869, in which, e.g., sides of sealing materials of adjacent cell units laterally contact with each other to be integrated, and such wide sealing material and a pair of glass substrates are cut at an intermediate position in the width direction of the sealing material.

However, considering non-uniformity of the width of the applied sealing material, there is a possibility that distortion of a cutoff line and reduction in moisture resistance are caused as described later.

Figure 6:
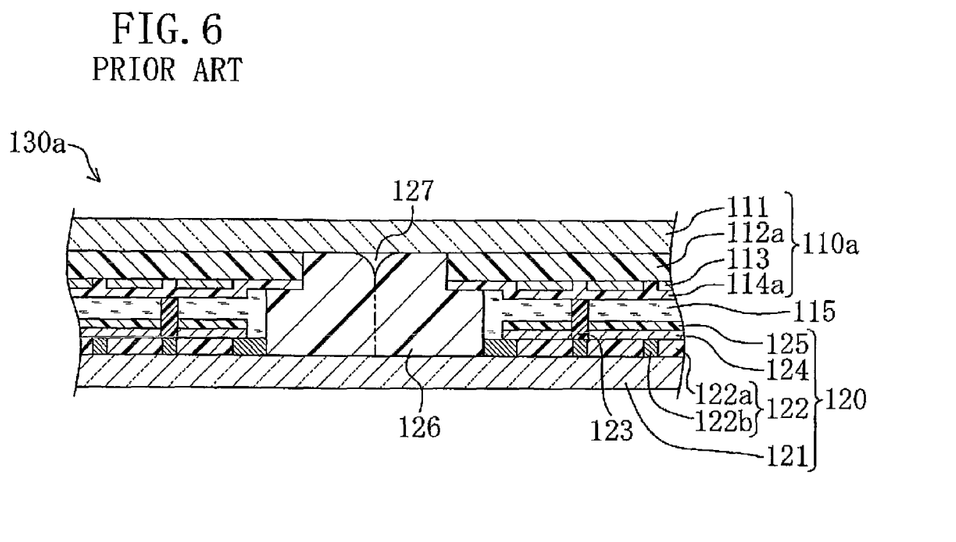
FIG. 6 is a cross-sectional view of a portion between cells of a conventional bonded body.
Figure 7:
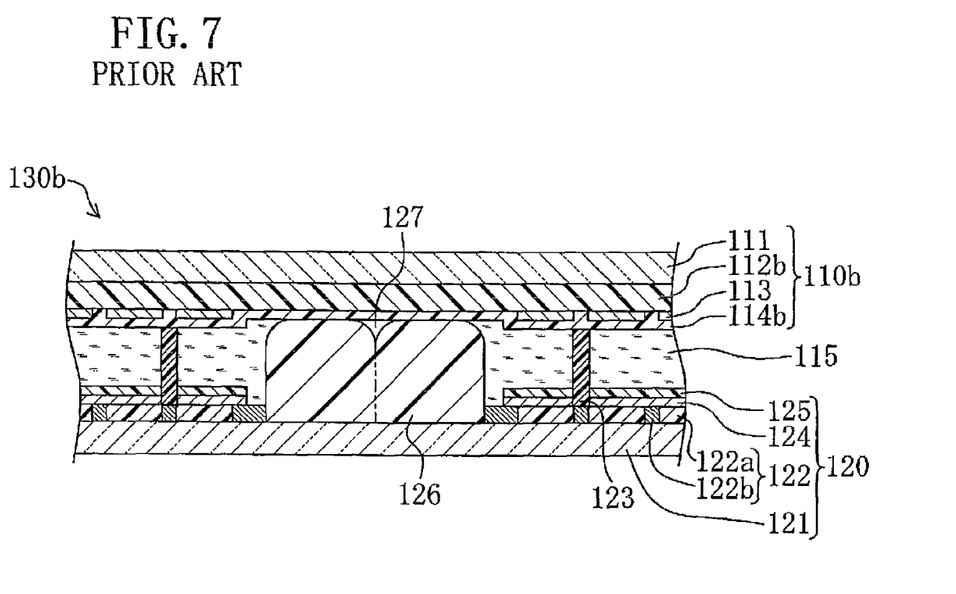
FIG. 7 is an another cross-section view of a portion between cells of a conventional bonded body.

FIGS. 6 and 7 are cross-sectional views of portions between cells in multi-sectioned bonded bodies 130a and 130b formed as the above-described pair of substrates by bonding TFT (thin film transistor) mother substrates 110a and 110b to color filter mother substrates 120 with liquid crystal layers 115 being interposed therebetween.

As illustrated in FIG. 6, the TFT mother substrate 110a includes a glass substrate 111; a plurality of TFTs (not illustrated in the figure) provided on the glass substrate 111; a resin film 112a provided so as to cover the TFTs; a plurality of pixel electrodes 113 arranged in a matrix on the resin film 112a; and an alignment film 114a provided so as to cover the pixel electrodes 113. The TFT mother substrate 110b has substantially the same structure as that of the TFT mother substrate 110a, except that a resin film 112b and an alignment film 114b are provided on the entire substrate as illustrated in FIG. 7. As illustrated in FIGS. 6 and 7, the color filter mother substrate 120 includes a glass substrate 121; a color filter layer 122 which is provided on the glass substrate 121, and contains colored layers 122a and a black matrix 122b; photo spacers 123 provided on the color filter layer 122; a common electrode 124 provided so as to cover the color filter layer 122; and an alignment film 125 provided so as to cover the common electrode 124.

As illustrated in FIGS. 6 and 7, in the bonded bodies 130a and 130b, the TFT mother substrates 110a and 110b are bonded to the color filter mother substrates 120 with sealing materials 126 being interposed therebetween. However, a space 127 may be formed between sides of the adjacent sealing materials 126.

Figure 8:
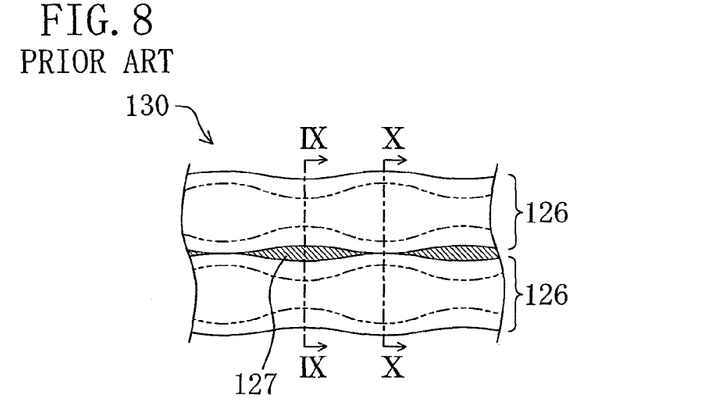
FIG. 8 is a schematic view from above, which illustrates sealing material of a conventional bonded body.
Figure 9:
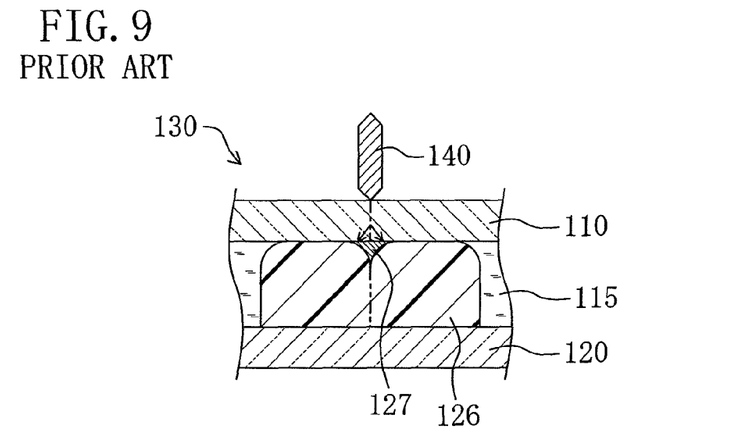
FIG. 9 is an IX-IX cross-sectional view of the bonded body of FIG. 8.
Figure 10:
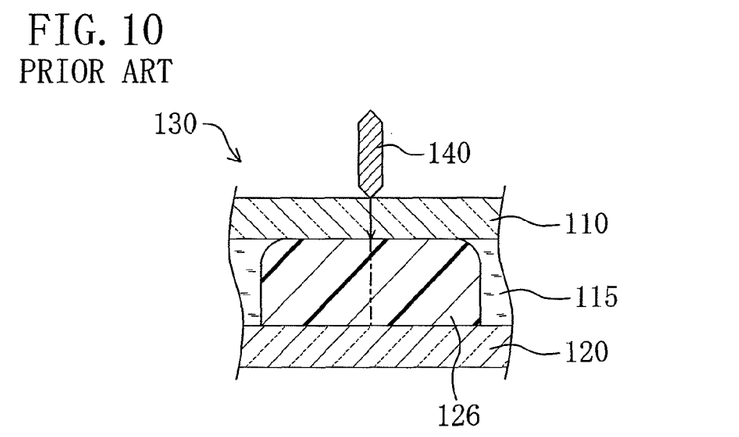
FIG. 10 is a X-X cross-sectional view of the bonded body of FIG. 8.

Such a space 127 may be formed due to non-uniformity of the width of the applied sealing material 126. FIG. 8 is a schematic view from above, which illustrates the sealing material 126 in a bonded body 130 equivalent to the bonded bodies 130a and 130b. FIGS. 9 and 10 are IX-IX and X-X cross-sectional views of the bonded body 130 of FIG. 8. In FIG. 8, a chain double-dashed line represents a side edge position of the sealing material 126 upon applying the sealing material 126.

Figure 11:
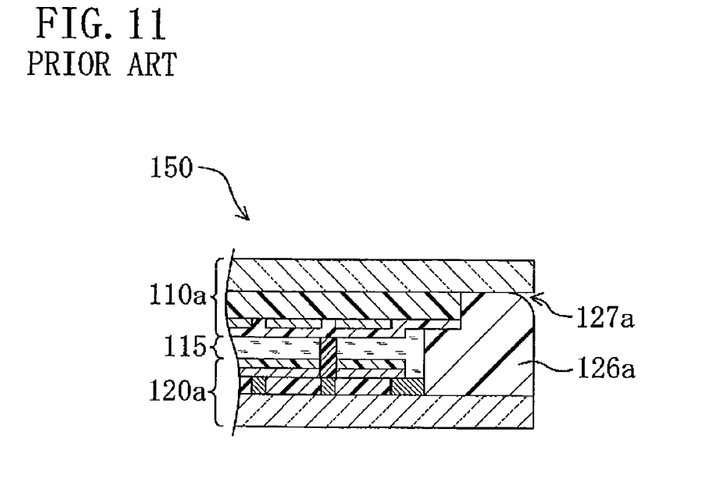
FIG. 11 is a cross-sectional view of a conventional liquid crystal display panel.

After linearly applying the sealing material 126, e.g., so as to form a plurality of frames on the color filter mother substrate 120, the color filter mother substrate 120 is bonded to the TFT mother substrate 110, thereby spreading the sealing material 126 in the width direction as illustrated in FIG. 8. As illustrated in FIGS. 8 and 10, in wider portions of the sealing materials 126, the sides of the adjacent sealing materials 126 contact and are integrated with each other to be fixed. On the other hand, in narrower portions of the sealing materials 126, even if the narrower portions are processed for the same period of time as that for the wider portions, the sides of the adjacent sealing materials 126 are fixed with the sides not contacting with each other as illustrated in FIGS. 8 and 9. The space 127 tends to be formed between the sides of the adjacent sealing materials 126 in the narrower portions of the sealing materials 126. Consequently, when the bonded body 130 is cut into cell units with a cutting blade 140, it is difficult to vertically apply a pressure from a blade edge of the cutting blade 140 on a substrate surface due to the space 127 present below the blade edge of the cutting blade 140. Hence, a scribe line (crack) is not vertically formed with respect to the substrate surface, thereby possibly causing the cutoff line distortion. Even if the scribe line is vertically formed with respect to the substrate surface, and the bonded body 130 is vertically cut with respect to the substrate surface as illustrated in FIG. 11, the cut bonded body 130, i.e., a liquid crystal display panel 150 has a cutting surface formed with a gap 127a due to the space 127 of the bonded body 130. Hence, an effective width of a sealing material 126a becomes narrower in such a portion, thereby possibly reducing the moisture resistance of the liquid crystal display panel 150.

The present disclosure has been made in view of the foregoing, and it is an object of the present disclosure to stabilize formation of the straight cutoff line of the liquid crystal display panel, and to reduce the degradation in the moisture resistance.

SUMMARY

In order to achieve such an object, in the present disclosure, a spacer is formed on a second mother substrate so as to extend between first and second sealing materials applied on a first mother substrate, and such mother substrates are bonded to each other to form a bonded body. Subsequently, the bonded body is cut at an intermediate position in the width direction of the spacer.

Specifically, a method for manufacturing a liquid crystal display panel of the present disclosure includes applying a first frame-like sealing material, and a second sealing material adjacent to the first sealing material along at least one side of the first sealing material, on a first mother substrate made of glass; forming a convex spacer on a second mother substrate made of glass so as to extend between the first and second sealing materials applied on the first mother substrate; bonding the first mother substrate on which the first and second sealing materials are applied, and the second mother substrate on which the spacer is formed, to each other such that the first and second sealing materials are in contact with each other without gaps with the spacer being interposed therebetween, and that a liquid crystal layer is sealed within the frame defined by the first sealing material, thereby forming a bonded body; and cutting the bonded body at an intermediate position in the width direction of the spacer.

According to the method described above, when bonding the first and second mother substrates to each other with the first and second sealing materials being interposed therebetween in the bonding of the first and second mother substrates, each of the first and second sealing materials applied on the first mother substrate in the applying of the first and second sealing materials spreads in the width direction by contacting the surface of the second mother substrate. Consequently, the first and second sealing materials contact with each other from the first mother substrate side to the second mother substrate side. In the forming of the spacer, the spacer is formed in advance in a region on the second mother substrate side, where the first and second sealing materials contact with each other. On the second mother substrate side, the first and second sealing materials contact with each other with the spacer being interposed therebetween, thereby being less likely to cause a space between the first and second sealing materials. In the cutting of the bonded body, the bonded body formed in the bonding of the first and second mother substrates is cut at the intermediate position in the width direction of the spacer, i.e., the position where a space is less likely to form between the first and second sealing materials, thereby, e.g., vertically applying a pressure from a cutting blade on the substrate surface. This vertically forms a scribe line (crack) with respect to the substrate surface to vertically cut the bonded body with respect to the substrate surface, thereby stabilizing formation of a straight cutoff line. In an end portion of the liquid crystal display panel formed by cutting the bonded body, a spacer piece formed by cutting the spacer is buried between a second substrate formed by cutting the second mother substrate, and an integrated body of the first and second sealing materials, thereby reducing degradation in moisture resistance of the liquid crystal display panel. Hence, the formation of the straight cutoff line of the liquid crystal display panel can be stabilized, and the degradation in the moisture resistance can be reduced.

The second sealing material may be applied in a frame-like shape in the applying of the first and second sealing materials, and a liquid crystal layer may be sealed within a frame defined by the second sealing material in the bonding of the first and second mother substrates.

According to the method described above, in the applying of the first and second sealing materials, the first and second frame-like sealing materials for sealing the liquid crystal layer are applied on the first mother substrate so as to be adjacent to each other. Hence, in the method for manufacturing the liquid crystal display panel by the gang printing in which a single glass substrate is divided and cut into a plurality of cell units, the features and advantages of the present disclosure are achieved.

The second sealing material may be a straight-line shape applied in the applying of the first and second sealing materials.

According to the method described above, in the applying of the first and second sealing materials, the frame-like first sealing material for sealing the liquid crystal layer, and the second linear sealing material which does not function to seal the liquid crystal layer are applied on the first mother substrate. Hence, in the method for manufacturing the liquid crystal display panel by forming one cell unit in a single glass substrate, the features and advantages of the present disclosure are achieved.

The height of the spacer may be equal to or lower than that of each of the first and second sealing materials in the bonded body.

According to the method described above, if the height of the spacer is equal to or lower than that of each of the first and second sealing materials, the first and second sealing materials contact with each other with the spacer being interposed therebetween. Hence, the features and advantages of the present disclosure are achieved.

The spacer may be made of resin.

According to the method described above, since the spacer is made of resin, the spacer is thickly formed on the first mother substrate, thereby being much less likely to form a space between the first and second sealing materials.

A protective film made of resin may be provided on the second mother substrate so as to cover thin film transistors, and the spacer may be made of the same material in the same layer as those of the protective film.

According to the method described above, the spacer is formed by using the resin protective film provided on the second mother substrate, thereby, without additional manufacturing processes, stabilizing the formation of the straight cutoff line of the liquid crystal display panel, and reducing the degradation in the moisture resistance.

The liquid crystal display panel of the present disclosure is the liquid crystal display panel manufactured by the manufacturing method of the present disclosure, and a spacer piece formed by cutting the spacer is buried between a second substrate formed by cutting the second mother substrate, and a sealing material formed by cutting an integrated body of the first and second sealing materials, in an end portion of the liquid crystal display panel formed in the cutting of the bonded body.

According to the structure described above, in the end portion of the liquid crystal display panel formed by cutting the bonded body, the spacer piece is buried between the second substrate and the sealing material, thereby reducing the degradation in the moisture resistance of the liquid crystal display panel.

DETAILED DESCRIPTION

Embodiments of the present disclosure will be explained hereinafter in detail with reference to the drawings. The present disclosure is not limited to each embodiment described below.

Embodiment 1

Figure 1:
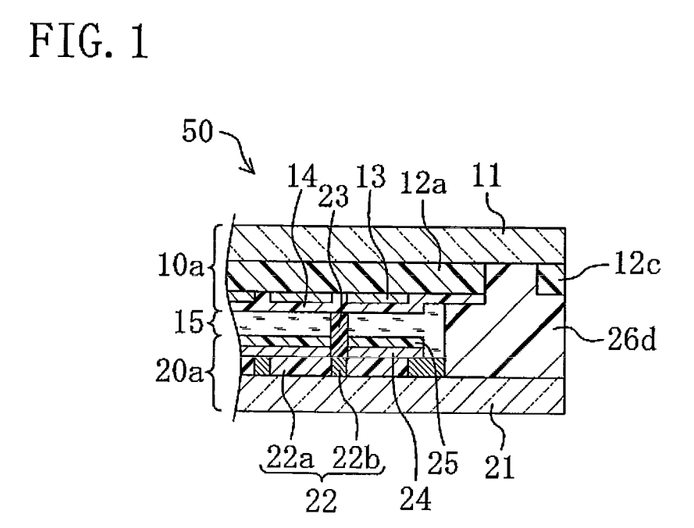
FIG. 1 is a cross-sectional view of a liquid crystal display panel of Embodiment 1.
Figure 2:
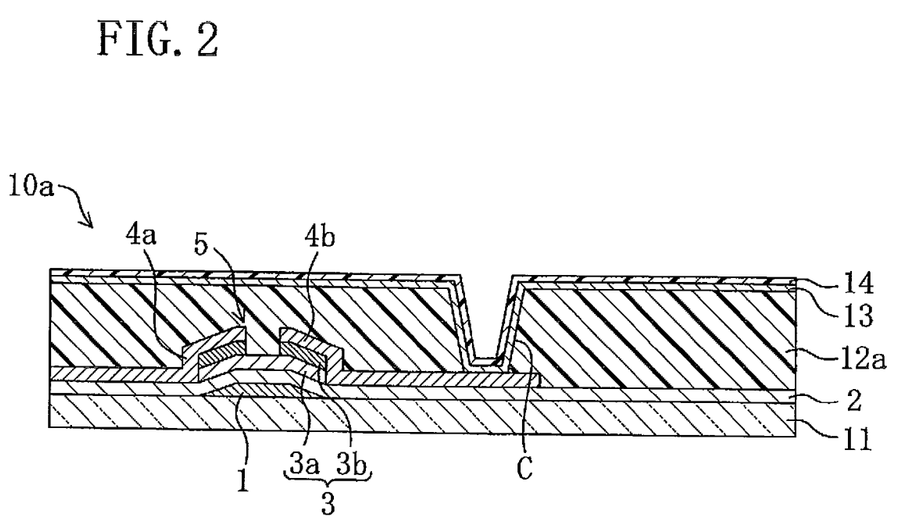
FIG. 2 is a cross-sectional view of a TFT substrate configuring the liquid crystal display panel.

FIGS. 1-5 illustrate Embodiment 1 of a liquid crystal display panel of the present disclosure and a manufacturing method thereof. Specifically, FIG. 1 is a cross-sectional view in an end portion of a liquid crystal display panel 50 of the present embodiment. FIG. 2 is a cross-sectional view illustrating one pixel of a TFT substrate 10a configuring the liquid crystal display panel 50.

As illustrated in FIG. 1, the liquid crystal display panel 50 includes a color filter substrate 20a provided as a first substrate; the TFT substrate 10a provided as a second substrate so as to oppose the color filter substrate 20a; a liquid crystal layer 15 provided between the color filter substrate 20a and the TFT substrate 10a; and a sealing material 26d for bonding the color filter substrate 20a and the TFT substrate 10a to each other, which is provided in a frame-like shape so as to surround the liquid crystal layer 15 between the color filter substrate 20a and the TFT substrate 10a.

As illustrated in FIG. 1, the color filter substrate 20a includes a glass substrate 21; a color filter 22 having a black matrix 22b provided in a grid pattern on the glass substrate 21, and a plurality of colored layers 22a, each of which is provided between the grids of the black matrix 22b, and is colored, e.g., red, green, or blue; a photo spacer 23 provided in a columnar shape so as to be overlapped with the black matrix 22b on the color filter 22; a common electrode 24 provided so as to cover the colored layers 22a; and an alignment film 25 provided so as to cover the common electrode 24.

As illustrated in FIGS. 1 and 2, the TFT substrate 10a includes a glass substrate 11; a plurality of gate lines (not illustrated in the figures) provided so as to extend parallel to each other on the glass substrate 11; a plurality of source lines (not illustrated in the figures) provided so as to extend parallel to each other in a direction perpendicular to the gate lines; a plurality of TFTs 5, each of which is provided at the intersection of the gate line and the source line; a protective film 12a provided so as to cover the TFTs 5; a plurality of pixel electrodes 13 provided in a matrix on the protective film 12a; and an alignment film 14 provided so as to cover the pixel electrodes 13.

As illustrated in FIG. 2, the TFT 5 includes a gate electrode 1 which is a portion laterally protruding from the gate line; a gate insulating film 2 provided so as to cover the gate electrode 1; a semiconductor layer 3 provided in an island-like shape at a location corresponding to the gate electrode 1 on the gate insulating film 2; and a source electrode 4a and a drain electrode 4b provided so as to face to each other on the semiconductor layer 3. The source electrode 4a is a portion laterally protruding from the source line. In addition, the drain electrode 4b is connected to the pixel electrode 13 through a contact hole C formed in the protective film 12a.

The sealing material 26d is made of, e.g., UV (ultraviolet) curing resin or heat/UV curing combined type resin. As illustrated in FIG. 1, a spacer piece 12c made of resin is buried between an outer circumferential edge of the sealing material 26d and a surface of the TFT substrate 10a (glass substrate 11).

The liquid crystal layer 15 is made of, e.g., nematic liquid crystal (liquid crystal material) having electrooptical property.

Figure 4:
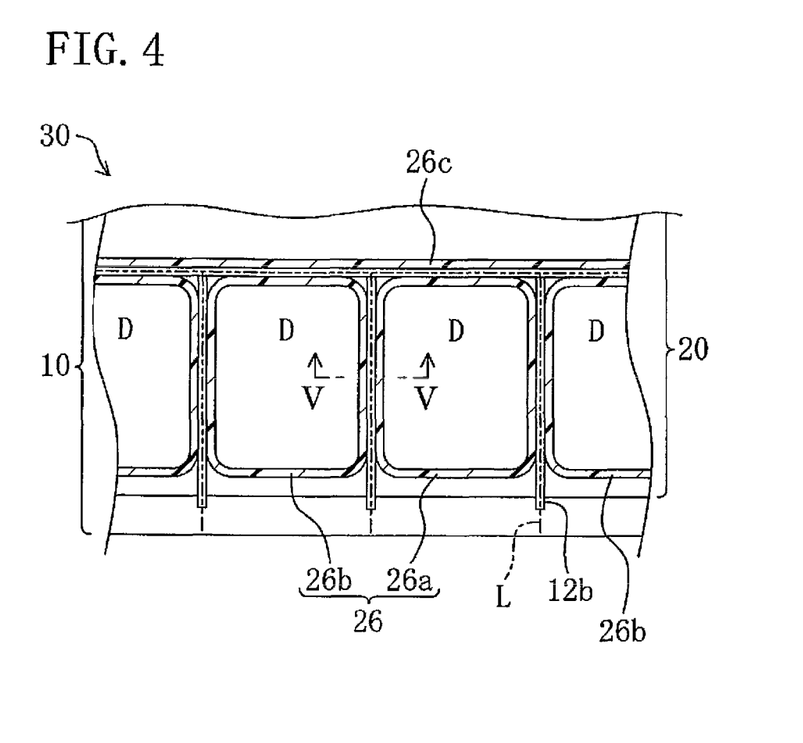
FIG. 4 is a plan view of the bonded body used for manufacturing the liquid crystal display panel.

In the liquid crystal display panel 50 with the above-described structure, a pixel which is a minimum unit of an image is configured with the pixel electrode 13 of the TFT substrate 10a, and the colored layer 22a of the color filter substrate 20a, and a display area D is configured by arranging such pixels in a matrix (see FIG. 4).

In each pixel of the liquid crystal display panel 50, when transmitting a gate signal from the gate line to the gate electrode 1 to turn on the TFT 5, a source signal is transmitted from the source line to the source electrode 4a, and a predetermined charge is written in the pixel electrode 13 through the semiconductor layer 3 and the drain electrode 4b. At this point, a potential difference is caused between the pixel electrode 13 of the TFT substrate 10a and the common electrode 24 of the color filter substrate 20a, and a predetermined voltage is applied to the liquid crystal layer 15. In the liquid crystal display panel 50, an alignment state of the liquid crystal layer 15 is changed depending on the magnitude of the voltage applied to the liquid crystal layer 15, thereby adjusting a light transmission rate of the liquid crystal layer 15 to display an image.

Figure 3:
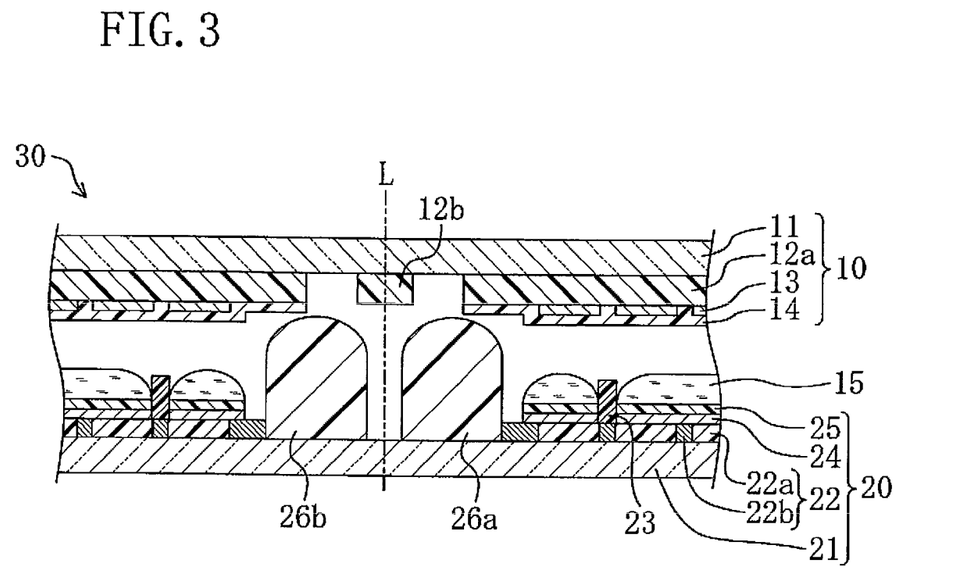
FIG. 3 is a cross-sectional view of a portion between cells before forming a bonded body used for manufacturing the liquid crystal display panel.
Figure 5:
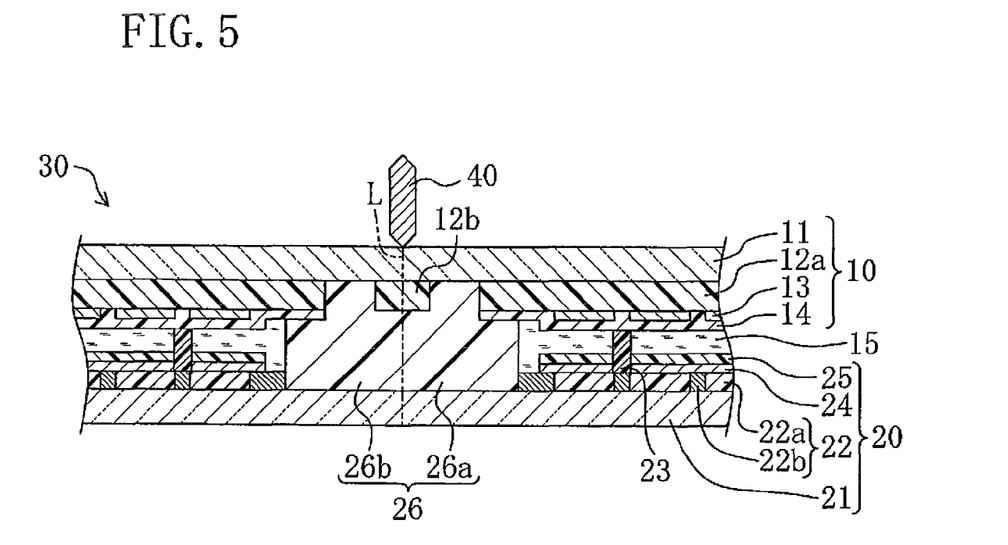
FIG. 5 is a V-V cross-sectional view of the bonded body of FIG. 4.

Next, a method for manufacturing the liquid crystal display panel 50 of the present embodiment by a gang printing will be explained with reference to FIGS. 3-5. FIG. 3 is a cross-sectional view of a portion between cells before forming a bonded body 30 used for manufacturing the liquid crystal display panel 50. FIG. 4 is a plan view of the formed bonded body 30 corresponding to that of FIG. 3, and FIG. 5 is a V-V cross-sectional view of the bonded body 30 of FIG. 4. The manufacturing method of the present embodiment includes preparation of a color filter mother substrate; application of sealing materials; preparation of a TFT mother substrate; bonding of the mother substrates; and cutting of the bonded body.

<Preparation of the Color Filter Mother Substrate>

First, on the entire glass substrate 21 having the thickness of approximately 0.7 mm, e.g., a chromium thin film is formed to the thickness of approximately 1000 Å by a sputtering technique. Such a film is patterned by a photolithography, thereby forming the black matrix 22b.

Subsequently, photosensitive resist material colored, e.g., red (R), green (G), or blue (B) is applied to the thickness of approximately 2 µm to portions between the grids of the black matrix 22b. Such material is patterned by the photolithography, thereby forming the colored layers 22a having the selected color (e.g., the color of R). Then, the similar process is repeated for other two colors, thereby forming the colored layers 22a having other two colors (e.g., the colors of G and B).

On the entire substrate on which the colored layers 22a are formed, an organic insulating film made of, e.g., photosensitive acrylic resin is formed to the thickness of approximately 3 μm by using a spin coating technique. Such a film is patterned by the photolithography, thereby forming the photo spacers 23.

Subsequently, on the entire substrate on which the photo spacers 23 are formed, e.g., an ITO (indium tin oxide) film is formed to the thickness of approximately 1000 Å by a sputtering technique using a mask, thereby forming the common electrode 24.

Finally, on the entire substrate on which the common electrode 24 is formed, polyimide resin is applied to the thickness of approximately 500 Å by a printing technique. A rubbing process is applied, thereby forming the alignment film 25.

As described above, the color filter mother substrate 20 configured with a plurality of cell-forming portions can be prepared.

<Application of the Sealing Materials>

Heat/UV curing combined type acrylic epoxy resin is applied in a frame-like shape on the color filter mother substrate 20 prepared in the preparation of the color filter mother substrate, by using an application device such as dispenser, thereby forming a first sealing material 26a and a second sealing material 26b. In addition, such resin is linearly applied, thereby forming a second sealing material 26c (see FIG. 4). In FIG. 4, an upper side of the first frame-like sealing material 26a is adjacent to the second linear sealing material 26c extending in the lateral direction of the figure; a left side of the first sealing material 26a is adjacent to a right side of the second frame-like sealing material 26b positioned on the left of the first sealing material 26a; and a right side of the first sealing material 26a is adjacent to a left side of the second frame-like sealing material 26b positioned on the right of the first sealing material 26a. The first and second sealing materials 26a, 26b, and 26c are applied with, e.g., the width of 300-400 μm, and the height of 15-25 μm. The first and second sealing materials 26a and 26b are applied such that their outer edges are inwardly positioned from a cutoff line L by approximately 0.2-0.4 mm.

<Preparation of the TFT Mother Substrate>

First, on the entire glass substrate 11 having the thickness of approximately 0.7 mm, a metal film made of, e.g., aluminum is formed to the thickness of approximately 1500 Å by the sputtering technique. Such a film is patterned by the photolithography, thereby forming the gate lines and the gate electrode 1.

Subsequently, on the entire substrate on which the gate electrode 1, etc. are formed, a silicon nitride film, etc. are formed to the thickness of approximately 4000 Å by a CVD (chemical vapor deposition) technique, thereby forming the gate insulating film 2.

On the entire substrate on which the gate insulating film 2 is formed, an intrinsic amorphous silicon film and a phosphorus-doped n+ amorphous silicon film are successively formed to the thickness of approximately 1500 Å and 400 Å by the CVD technique. Such films are patterned an island-like shape on the gate electrode 1 by the photolithography, thereby forming the semiconductor-constituting layer in which the intrinsic amorphous silicon film 3a and the n+ amorphous silicon film are laminated.

On the entire substrate on which the semiconductor-constituting layer is formed, a metal film made of, e.g., titanium is formed to the thickness of approximately 1500 Å by the sputtering technique. Such a film is patterned by the photolithography, thereby forming the source lines, the source electrode 4a, and the drain electrode 4b.

Subsequently, the n+ amorphous silicon film of the semiconductor-constituting layer is etched by using the source electrode 4a and the drain electrode 4b as a mask to form the semiconductor layer 3 configured with the intrinsic amorphous silicon film 3a and the n+ amorphous silicon film 3b, thereby forming the TFT 5.

On the entire substrate on which the TFT 5 is formed, an organic insulating film made of e.g., photosensitive acrylic resin is formed to the thickness of approximately 3 μm by the spin coating technique. Such a film is patterned by the photolithography to form the contact hole C on the drain electrode 4b, thereby forming the protective film 12a. In addition, the organic insulating film is linearly patterned between the cell-forming portions, thereby forming a spacer 12b so as to be arranged between the first sealing material 26a, and the second sealing material 26b or 26c, which are applied on the color filter mother substrate 20 (Forming of the Spacer).

On the entire substrate on which the protective film 12a, etc. are formed, an ITO film is formed to the thickness of approximately 1000 Å by the sputtering technique. Such a film is patterned by the photolithography, thereby forming the pixel electrodes 13.

Finally, on the entire substrate on which the pixel electrodes 13 are formed, polyimide resin is applied to the thickness of approximately 500 Å by the printing technique. The rubbing process is applied, thereby forming the alignment film 14.

As described above, the TFT mother substrate 10 configured with a plurality of cell-forming portions can be prepared.

<Bonding of the Mother Substrates>

First, liquid crystal material is dispensed onto portions inside the frames defined by the first and second sealing materials 26a and 26b of the color filter mother substrate 20 on which the sealing materials are applied in the application of the sealing materials.

Subsequently, the color filter mother substrate 20 onto which the liquid crystal material is dispensed, and the TFT mother substrate 10 are bonded to each other under reduced pressure such that the display areas D of the color filter mother substrate 20 and TFT mother substrate 10 are overlapped with each other, and that the spacers 12b of the TFT mother substrate 10 are arranged between the first sealing material 26a, and the second sealing material 26b or 26c on the color filter mother substrate 20. The surfaces of the TFT mother substrate 10 and the color filter mother substrate 20 are pressurized at approximately 0.1 MPa by exposing the bonded mother substrates to air atmosphere, thereby sealing the liquid crystal layer 15 as illustrated in FIGS. 4 and 5 (Bonding of the Mother Substrates). The first and second sealing materials 26a, 26b, and 26c applied in the application of the sealing materials have, e.g., the width of 0.5-1.0 mm, and the height of 6-7 μm due to the pressurization of the substrates. At this point, at the adjacent sides of the first sealing material 26a, and the second sealing material 26b or 26c, the first sealing material 26a and the second sealing material 26b (26c) contact with each other with the spacer 12b being interposed therebetween.

An UV light is irradiated to the TFT mother substrate 10 and the color filter mother substrate 20, which are bonded to each other, through a mask to precure the first and second sealing materials 26a, 26b, and 26c. The bonded mother substrates are heated at 120° C. for approximately one hour, thereby post-curing the first and second sealing materials 26a, 26b, and 26c.

Chemical polishing (chemical etching) is applied to the TFT mother substrate 10 and the color filter mother substrate 20 in which the sealing materials are cured after bonding the mother substrates. This reduces the thickness of the TFT mother substrate 10 and the color filter mother substrate 20 to approximately 0.1-0.3 mm, thereby forming the bonded body 30.

<Cutting of the Bonded Body>

First, as illustrated in FIGS. 4 and 5, on the surface on the TFT mother substrate 10 side of the bonded body 30, a cutting blade 40 rotates along the cutoff line L with a blade edge of the cutting blade 40 contacting a center position in the width direction of the spacer 12b. This forms a crack in the surface of the TFT mother substrate 10, and the TFT mother substrate 10 of the bonded body 30 is cut by extending such a crack in the substrate width direction.

Subsequently, the bonded body 30 in which the TFT mother substrate 10 is cut off is turned over, and the cutting blade 40 rotates along the cutoff line L with the blade edge of the cutting blade 40 contacting the surface on the color filter mother substrate 20 side of the bonded body 30. This forms a crack in the surface of the color filter mother substrate 20, and the color filter mother substrate 20 of the bonded body 30 is cut by extending such a crack in the substrate width direction. At this point, the TFT mother substrate 10 and the color filter mother substrate 20 are cut, thereby forming the TFT substrate 10a and the color filter substrate 20a, and cutting the spacer 12b and the sealing material 26 in which the first and second sealing materials 26a and 26b (26c) are integrated. The spacer piece 12c and the sealing material 26d are formed by cutting the spacer 12b and the sealing material 26, thereby cutting the bonded body 30 into the cell units.

As described above, the liquid crystal display panel 50 of the present embodiment can be manufactured.

As explained above, according to the liquid crystal display panel 50 of the present embodiment and the manufacturing method thereof, when bonding the color filter mother substrate 20 to the TFT mother substrate 10 with the first and second sealing materials 26a, 26b, and 26c being interposed therebetween in the bonding of the mother substrates, each of the first and second sealing materials 26a, 26b, and 26c applied on the color filter mother substrate 20 in the application of the sealing materials spreads in the width direction by contacting the surface of the TFT mother substrate 10. Consequently, the first sealing material 26a, and the second sealing material 26b or 26c contact with each other from the color filter mother substrate 20 side to the TFT mother substrate 10 side. In the forming of the spacer, the spacer 12b is formed in advance in a region on the TFT mother substrate 10 side, where the first sealing material 26a, and the second sealing material 26b or 26c contact with each other. On the TFT mother substrate 10 side, the first sealing material 26a, and the second sealing material 26b or 26c contact with each other with the spacer 12b being interposed therebetween, thereby being less likely to cause a space between the first sealing material 26a, and the second sealing material 26b or 26c. In the cutting of the bonded body, the bonded body 30 formed in the bonding of the mother substrates is cut at the center position in the width direction of the spacer 12b, i.e., the position where a space is less likely to form between the first sealing material 26a, and the second sealing material 26b or 26c, thereby vertically applying a pressure from the cutting blade 40 on the substrate surface. This vertically forms a scribe line (crack) with respect to the substrate surface to vertically cut the bonded body 30 with respect to the substrate surface, thereby stabilizing the formation of the straight cutoff line. In the end portion of the liquid crystal display panel 50 formed by cutting the bonded body 30, the spacer piece 12c formed by cutting the spacer 12b is buried between the TFT substrate 10a formed by cutting the TFT mother substrate 10 and the integrated body of the first sealing material 26a and the second sealing material 26b (26c), i.e., the sealing material 26d formed by cutting the sealing material 26, thereby reducing degradation in moisture resistance of the liquid crystal display panel 50. Hence, the formation of the straight cutoff line of the liquid crystal display panel can be stabilized, and the degradation in the moisture resistance can be reduced.

According to the present embodiment, since the spacer 12b is made of resin, the spacer 12b can be thickly formed on the color filter mother substrate 20, thereby being much less likely to form a space between the first sealing material 26a, and the second sealing material 26b or 26c.

In addition, according to the present embodiment, the spacer 12b is formed by using the protective film 12a (organic insulating film) provided on the TFT mother substrate 10, thereby, without additional manufacturing processes, stabilizing the formation of the straight cutoff line of the liquid crystal display panel, and reducing the degradation in the moisture resistance.

Other Embodiments

In Embodiment 1, the sealing materials are applied on the color filter mother substrate 20, and the spacer 12b is formed by using the protective film 12a of the TFT mother substrate 10. However, in the present disclosure, the sealing materials may be applied on the TFT mother substrate 10, and the spacer may be formed by, e.g., using an overcoat film provided between the color filter 22 and the common electrode 24 of the color filter mother substrate 20.

In Embodiment 1, the method for manufacturing the liquid crystal display panel by the gang printing in which a single glass substrate is divided and cut into a plurality of cell units has been explained. However, the present disclosure may be applicable to a method for manufacturing a liquid crystal display panel in which only a frame-like first sealing material for sealing a liquid crystal layer, and a second sealing material which does not function to seal the liquid crystal layer are applied in the application of the sealing materials, thereby forming one cell unit in a single glass substrate.

In addition, in Embodiment 1, the method in which the bonded body 30 is cut at the center position in the width direction of the spacer 12b has been described. However, in the present disclosure, the bonded body 30 may be cut at an intermediate position in the width direction of the spacer 12b. The "center" position means a middle position in the width direction of the spacer 12b, and the "intermediate" position means any position between both ends in the width direction of the spacer 12b.

In Embodiment 1, the active-matrix-driven liquid crystal display panel and the manufacturing method thereof have been described. However, the present disclosure may be applicable to a passive-matrix-driven liquid crystal display panel and a manufacturing method thereof.

As explained above, the present disclosure can stabilize the cutoff line of the liquid crystal display panel manufactured by a one-drop-filling method. Hence, the present disclosure is useful for various types of liquid crystal display panels, e.g., compact-size portable liquid crystal display panels, and large-size liquid crystal display panels intended for liquid crystal televisions.

What is claimed is:

1. A method for manufacturing a liquid crystal display panel, the method comprising:

applying a first frame-like sealing material, and a second sealing material adjacent to the first sealing material along at least one side of the first sealing material, on a first mother substrate made of glass;

forming a convex spacer on a second mother substrate made of glass so as to extend between the first and second sealing materials applied on the first mother substrate;

bonding the first mother substrate on which the first and second sealing materials are applied, and the second mother substrate on which the spacer is formed, to each other such that the first and second sealing materials are in contact with each other without gaps with the spacer being interposed therebetween, and that a liquid crystal layer is sealed within the frame defined by the first sealing material, thereby forming a bonded body; and cutting the bonded body at an intermediate position in the width direction of the spacer.

2. The method of claim 1, wherein
the second sealing material is applied in a frame-like shape in the applying the first and second sealing materials; and
a liquid crystal layer is sealed within the frame defined by the second sealing material in the bonding the first and second mother substrates.

3. The method of claim 1, wherein
the second sealing material is a straight-line shape applied in the applying the first and second sealing materials.

4. The method of claim 1, wherein
the height of the spacer is equal to or lower than that of each of the first and second sealing materials in the bonded body.

5. The method of claim 1, wherein
the spacer is made of resin.

6. The method of claim 5, wherein
a protective film made of resin is provided on the second mother substrate so as to cover thin film transistors; and
the spacer is made of the same material in the same layer as those of the protective film.

7. A liquid crystal display panel manufactured by the manufacturing method of claim 1, wherein
a spacer piece formed by cutting the spacer is buried between a second substrate formed by cutting the second mother substrate, and a sealing material formed by cutting an integrated body of the first and second sealing materials, in an end portion of the liquid crystal display panel formed in the cutting the bonded body.

* * * * *